(12) United States Patent
Na (10) Patent No.: US 12,474,850 B2
(45) Date of Patent: Nov. 18, 2025

(54) STORAGE DEVICE, HOST DEVICE, AND COMPUTING SYSTEM

(71) Applicant: SK hynix Inc., Icheon (KR)

(72) Inventor: Hyeong Ju Na, Icheon (KR)

(73) Assignee: SK hynix Inc., Icheon (KR)

( * ) Notice: Subject to any disclaimer, the term of this patent is extended or adjusted under 35 U.S.C. 154(b) by 79 days.

(21) Appl. No.: 18/488,672

(22) Filed: Oct. 17, 2023

(65) Prior Publication Data

US 2024/0377975 A1 Nov. 14, 2024

(30) Foreign Application Priority Data

May 11, 2023 (KR) .................. 10-2023-0061027

(51) Int. Cl.
*G06F 3/06* (2006.01)

(52) U.S. Cl.
CPC ............ *G06F 3/064* (2013.01); *G06F 3/0607* (2013.01); *G06F 3/0658* (2013.01); *G06F 3/0679* (2013.01)

(58) Field of Classification Search
CPC ...... G06F 3/0607; G06F 3/064; G06F 3/0658; G06F 3/0679
See application file for complete search history.

(56) References Cited

U.S. PATENT DOCUMENTS

2014/0101115 A1* 4/2014 Ko ..................... G06F 16/17
707/692
2016/0188462 A1 6/2016 Shin et al.

FOREIGN PATENT DOCUMENTS

KR 1020190107963 A 9/2019
KR 1020210142863 A 11/2021

* cited by examiner

*Primary Examiner* — Yong J Choe (57) ABSTRACT

In an embodiment of the disclosed technology, a controller of a host device may manage data stored in a storage device, on the basis of a section which corresponds to a super block of the storage device and includes at least two segments. It is possible to provide measures enabling limited overwrite of a full section including a valid segment and allowing allocation and garbage collection to be performed by the unit of segment, thereby efficiently using a storage space while maintaining a log structure file system of the storage device.

17 Claims, 10 Drawing Sheets

<EX 1 – Open Section>

<EX 2 – Empty Section>

☐ :Section (Unwritable)   ☐ :Section (Writable)

▨ :Segment (Unwritable)   ▨ :Segment (Writable)

▌ :Block (Written/Valid)   ▌ :Block (Unwritten/Invalid)

FIG.5

<EX 3 – Victim Section>

<EX 4 – Victim Section>

FIG. 9

STORAGE DEVICE, HOST DEVICE, AND COMPUTING SYSTEM

CROSS-REFERENCE TO RELATED APPLICATION

The present application claims priority under 35 U.S.C. § 119 (a) to Korean Patent Application No. 10-2023-0061027 filed in the Korean Intellectual Property Office on May 11, 2023, which is incorporated herein by reference in its entirety.

BACKGROUND

1. Technical Field

Various embodiments generally relate to a storage device, a host device, and a computing system.

2. Related Art

A computing system may include a storage device which stores data and a host device which controls the storage device. The host device may write data to or erase data in the storage device, and may read data from the storage device.

The host device may include a file system. The host device may divide a storage area of the storage device and manage data stored in the storage device using the file system.

Since the performance of the computing system may vary depending on a scheme in which the file system manages data stored in the storage device, measures are required for the file system to be capable of efficiently managing data stored in the storage device.

SUMMARY

Various embodiments of the disclosed technology are directed to measures for a file system included in a host device to be capable of efficiently managing data stored in a storage device.

In an embodiment, a computing system may include: a storage device configured to store data; and a host device configured to manage the data stored in the storage device, on the basis of a section including at least two segments, and when an empty section does not exist upon a segment allocation request for a write operation, allocate at least one free segment including a first segment which is included in a victim section and is invalid.

In an embodiment, a host device may include: a host memory; and a controller configured to manage data stored in a storage device, on the basis of a section including at least two segments, and when an empty section does not exist upon a segment allocation request for a write operation, move information written to a first segment which is included in a victim section and is valid, to a segment which is included in a temporary section, and allocate the first segment by changing the first segment to be invalid.

In an embodiment, a storage device may include: a memory including a first super block including a first area in which first data is stored and a second area in which second data is stored; and a memory controller configured to control an operation of the memory, wherein data identical to the first data is written to a second super block according to a write command inputted from a host device, and third data different from the first data is written to at least a part of a third area which is included in a third super block and corresponds to the first area included in the first super block.

According to the embodiments of the disclosed technology, it is possible to improve the efficiency of a write operation using a file system included in a host device while maintaining a log structure file system of a storage device.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", or "contacts or overlaps" a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", each other via a fourth element. Here, the second element may be included in at least one of two or more elements that "are connected or coupled to", "contact or overlap", each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 1:
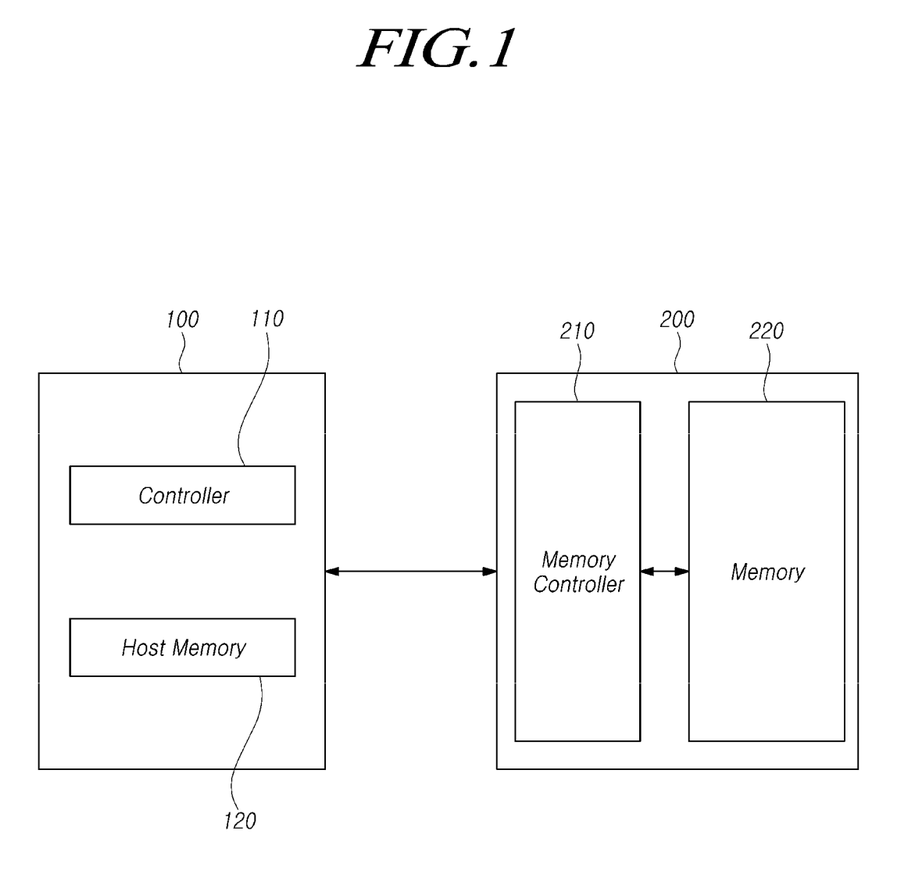
FIG. 1 illustrates a computing system according to an embodiment of the disclosed technology.
Figure 2:
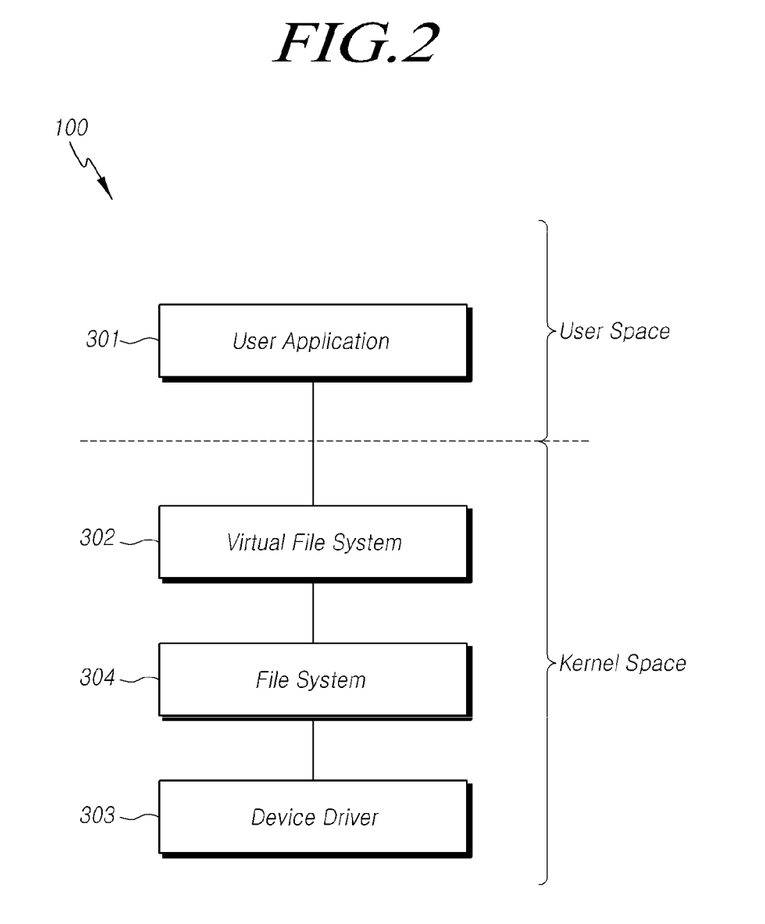
FIG. 2 illustrates a host device according to an embodiment of the disclosed technology.

FIG. 1 illustrates a computing system according to an embodiment of the disclosed technology. FIG. 2 illustrates a host device 100 according to an embodiment of the disclosed technology.

Referring to FIGS. 1 and 2, the computing system may include the host device 100 and a storage device 200.

The host device 100 and the storage device 200 may communicate with each other using a specific protocol.

For example, the host device 100 and the storage device 200 may communicate using at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, and an IDE (integrated drive electronics) protocol, but interface protocols are not limited thereto.

The host device 100 may control the storage device 200. The host device 100 may store or erase data in the storage device 200. Also, the host device 100 may read data from the storage device 200.

The host device 100 may include a controller 110 and a host memory 120.

The controller 110 may divide a storage area of the storage device 200. The controller 110 may control the storage device 200 so that data is stored in the storage area. The controller 110 may mean a file system such as a flash-friendly file system (F2FS) or a configuration which manages and controls a file system.

The host memory 120 may be loaded with file data provided by a user application in order to store data in the storage device 200. The host memory 120 may include a volatile memory such as a DRAM, an SDRAM, a DDR SDRAM, an LPDDR SDRAM, a GRAM, or the like, but embodiments are not limited thereto.

Referring to FIG. 2, the host device 100 may include a user space and a kernel space.

Each component shown in FIG. 2 may be implemented with software, or may be implemented with hardware such as a field-programmable gate array (FPGA) or an application-specific integrated circuit (ASIC). In addition, the component is not limited to software or hardware, and may be configured in an addressable storage medium or configured to execute one or more processors. A function provided by the component may be realized by subdivided components, or a plurality of components may be combined to implement one component which performs a specific function.

The user space may be an area where a user application 301 is executed. The kernel space may be an area that is allocated for kernel execution. A system call may be used to access the kernel space from the user space.

The kernel space may include a virtual file system 302, a file system 304, and a device driver 303.

The file system 304 may correspond to the controller 110 described above, and may include one or more file systems. The file system 304 or the controller 110 may be a log structure file system. The file system 304 or the controller 110 may be a flash-friendly file system (F2FS) that is a file system for a Linux kernel designed according to flash memory characteristics, or a journaling flash file system that is a Linux log structure file system used in a NOR flash memory device. The type of the file system 304 or the controller 110 is not limited to the log structure file system, and the embodiment of the disclosed technology may be applied to the file system 304 or the controller 110 in which, when a file is updated, new data is written to a logical address that is different from a logical address to which existing data is written.

Referring to FIGS. 1 and 2, the file system 304 can be referred to as the controller 110, and the controller 110 may divide the storage area of the storage device 200 to correspond to a plurality of sections and manage data stored in the storage device 200 based on the plurality of sections. Each of the plurality of sections may be referred to as a zone. Each of the plurality of sections may include at least two segments. Each of the segments may include a plurality of blocks.

The controller 110 may write, to each block, a log provided by the user application 301.

When a write request is generated by the user application 301, the controller 110 may allocate a segment or a block for a write operation. Information according to the write operation may be written to the segment or the block, and data for the write operation may be written to a storage area of the storage device 200 that corresponds to the segment or the block.

The virtual file system 302 may allow one or more controllers 110 to interact with each other. The virtual file system 302 may use standardized system calls to perform a read/write operation for different controllers 110 of different media. For example, system calls such as open( ), read( ), and write( ) may be used regardless of a type of a controller 110. The virtual file system 302 may exist as an abstraction layer between the user space and the controller 110 (or the file system 304).

The device driver 303 may be responsible for the interface between hardware and the user application 301. The device driver 303 may be a program that is necessary for hardware to operate properly under a specific operating system.

Under the control of the controller 110 of the host device 100, data may be stored in or deleted from the storage device 200 or data stored in the storage device 200 may be read.

Referring back to FIG. 1, the storage device 200 may include a memory controller 210 and a memory 220.

The memory controller 210 may control an operation of the memory 220 according to a command input from the host device 100. The memory controller 210 may also control the operation of the memory 220 according to a command generated inside the memory controller 210.

The memory controller 210 may include a host interface that communicates with the host device 100 and a memory interface that communicates with the memory 220.

The memory controller 210 may include a control circuit that performs overall control operations of the memory controller 210 in order to control the operation of the memory 220. The control circuit may include a processor, a working memory, and so forth, and may optionally include an error detection and correction circuit.

The processor may perform the function of a flash translation layer (FTL). The processor may translate a logical block address provided by the host device 100 into a physical block address through the flash translation layer. The flash translation layer may receive a logical block address and translate the logical block address into a physical block address using a mapping table.

The processor may execute firmware to control the operation of the memory controller 210. In order to control overall operations of the memory controller 210 and perform logical operations, the processor may load and execute (or drive) firmware in the working memory upon booting.

The memory controller 210 may control program, read, and erase operations for the memory 220. Also, the memory controller 210 may control a background operation including at least one of garbage collection, wear leveling, read reclaim and bad block management. As the case may be, at least a part of the background operation controlled by the memory controller 210 may not be performed due to an operation performed by the host device 100.

The memory 220 may include a memory cell array that includes a plurality of memory cells storing data. The memory cell array may exist in a memory block.

For example, the memory 220 may be implemented into any of various types of memory such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and the like. The memory 220 may be implemented into a three-dimensional array structure. The embodiment of the disclosed technology may be applied to not only a flash memory in which a charge storage layer is configured by a conductive floating gate but also a charge trap flash (CTF) in which a charge storage layer is configured by an insulating film.

The memory 220 may receive a command and an address from the memory controller 210. The memory 220 may access an area which is selected by the address in the memory cell array. The memory 220 may perform an operation indicated by the command, on the area selected by the address.

A storage area in which data is stored in the memory 220 may be managed by the controller 110 of the host device 100. The storage area managed by the controller 110 and a memory block of the memory 220 may correspond to each other in various ways.

Figure 3:
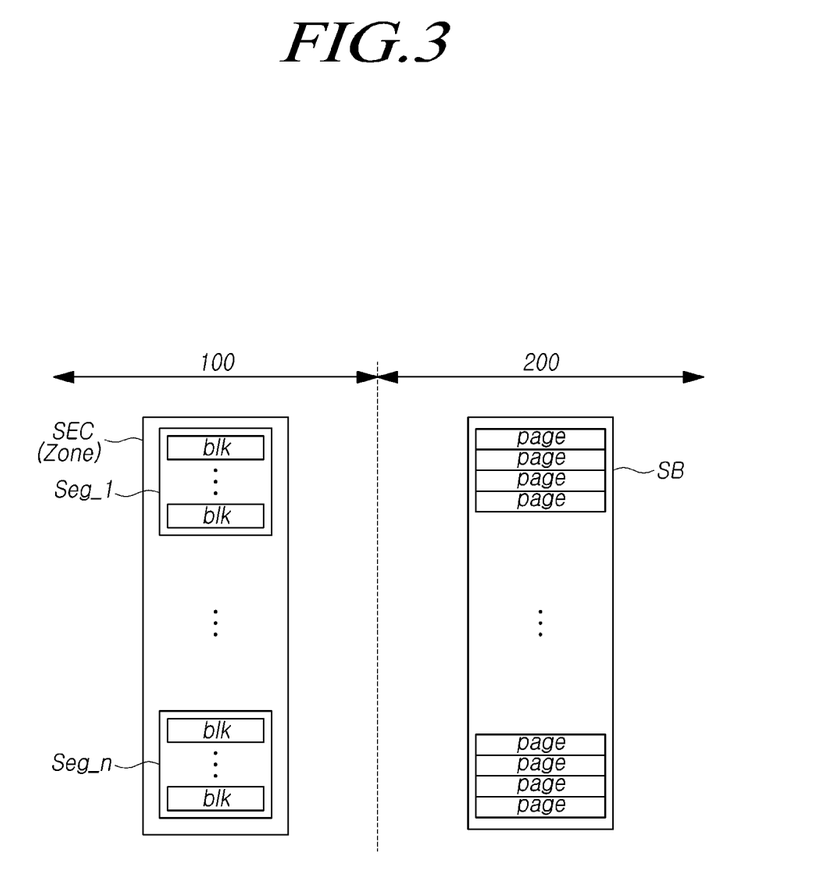
FIG. 3 illustrates a relationship between a section managed by a controller of a host device and a super block of a storage device according to an embodiment of the disclosed technology.

FIG. 3 illustrates a relationship between a section SEC managed by the controller 110 of the host device 100 and a super block SB of the storage device 200 according to an embodiment of the disclosed technology.

Referring to FIGS. 1 and 3, the controller 110 of the host device 100 may manage data in units of sections. In the present specification, a section SEC may have the same meaning as a zone.

The section SEC may include two or more segments Seg_1, . . . , and Seg_n, n being a positive integer. Each of the two or more segments Seg_1, . . . , and Seg_n may include a plurality of blocks. When a request for a write operation is generated, a segment or a block may be allocated.

The section SEC may correspond to a super block SB included in the memory 220 of the storage device 200. For example, the size of the section SEC may be the same as the size of the super block SB. As the size of the super block SB included in the memory 220 increases, the size of the section SEC may also increase.

The memory controller 210 may control write, read, and erase operations of data in units of super blocks. The super block SB may be formed by logically grouping a plurality of memory blocks included in the memory 220.

Each super block SB may include at least two memory blocks among the plurality of memory blocks included in the memory 220.

At least two memory blocks included in the super block SB may be included in the same plane. Alternatively, at least two memory blocks included in the super block SB may be included in different planes. As the case may be, at least two memory blocks included in a first plane and at least two memory blocks included in a second plane may constitute one super block SB, the first plane being different from the second plane.

Each of the plurality of memory blocks included in the memory 220 may include a plurality of pages. Therefore, a super block SB including at least two memory blocks may include a plurality of pages. Data may be written and read in units of pages. Erasing of data may be performed in units of super blocks.

Each of the plurality of pages included in the super block SB may correspond to a block included in a segment Seg. As the case may be, at least two pages may correspond to one block included in a segment Seg.

The controller 110 may manage data in units of sections, each section including at least two segments Seg, thereby managing data that is stored in a super block SB of the memory 220 which corresponds to a section SEC.

Since the controller 110 manages data in the units of sections, where each section corresponds to a super block SB and serves as a unit for storing and managing data in the memory 220, the management of a storage area where data is stored in the memory 220 may be facilitated. Since the controller 110 may manage the storage area where data is stored in the memory 220 by overseeing the section SEC and the segment Seg, it enables the controller 110 of the host device 100 to perform a management operation that enhances the efficiency of the storage area of the memory 220. Therefore, the load of the storage device 200 may be reduced, and the operating efficiency of the storage device 200 may be improved.

The controller 110 may perform a write operation on a per-segment basis within the section SEC. By allocating a segment Seg for a write operation rather than a section SEC, the efficiency of the write operation may be increased.

Also, the controller 110 may allow partial overwriting for some segments Seg included in the section SEC. The controller 110 may allow overwriting under a predetermined condition to increase the efficiency of a write operation and maintain the characteristics of the log structure file system even when the storage device 200 complies with a universal flash storage (UFS).

Figure 4:
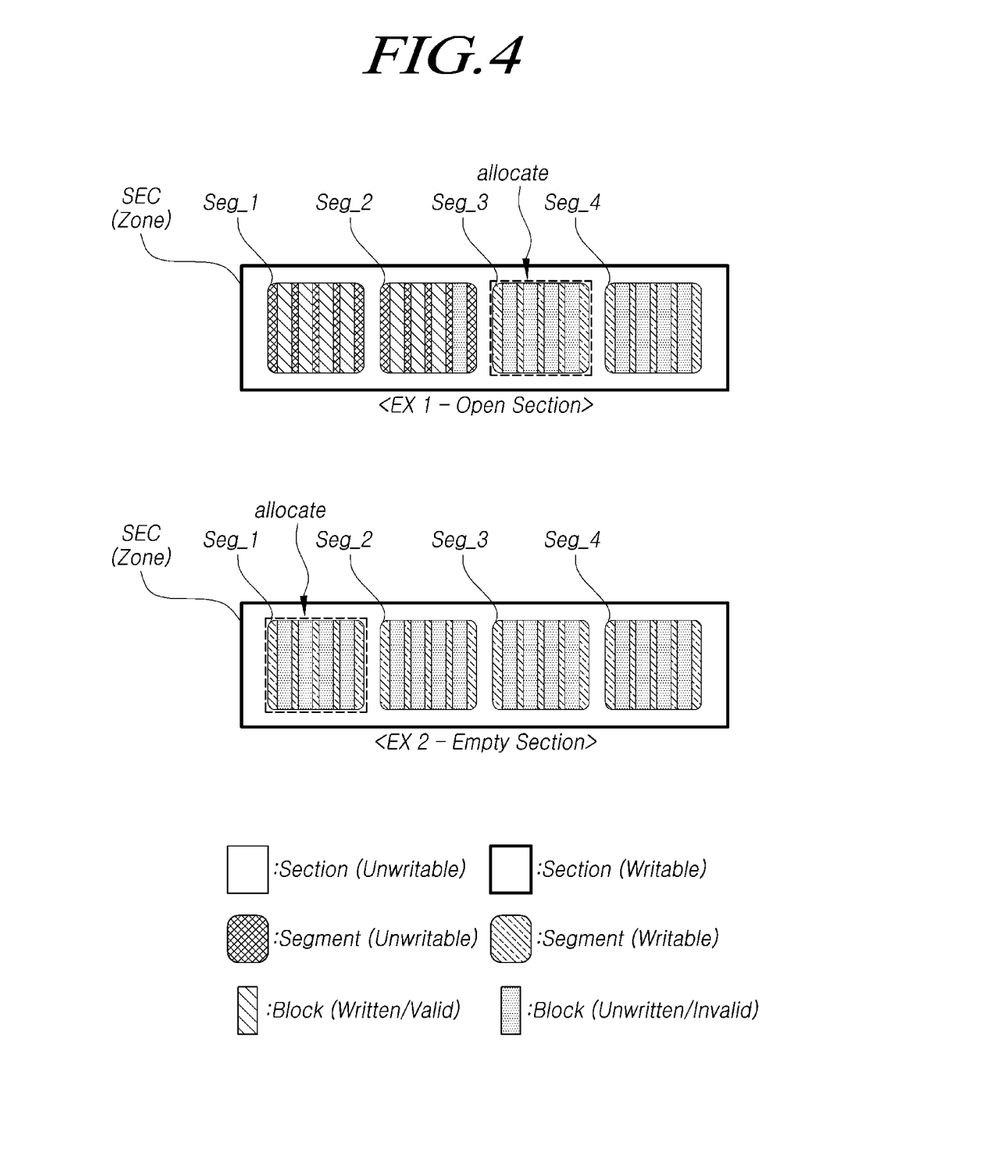
FIGS. 4 and 5 illustrate types of a section managed by a controller according to an embodiment of the disclosed technology.
Figure 5:
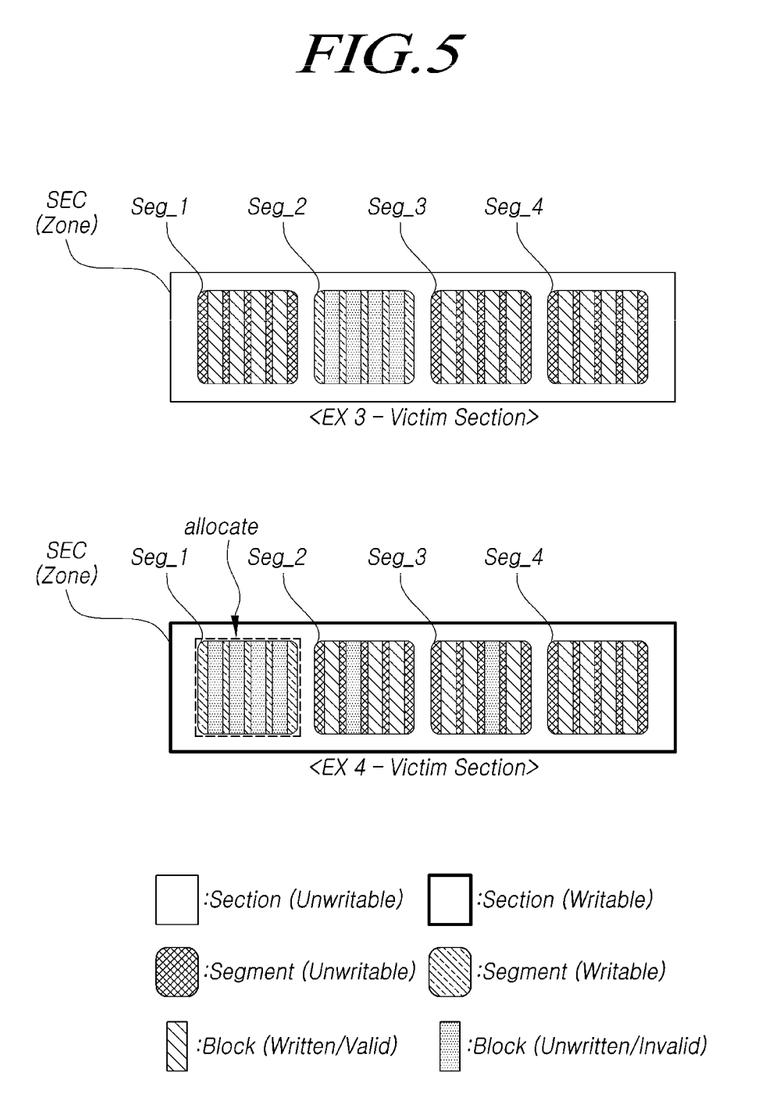

FIGS. 4 and 5 illustrate types of a section SEC managed by the controller 110 according to an embodiment of the disclosed technology.

Referring to FIGS. 4 and 5, a case where a section SEC includes four segments Seg is shown as an example. Each segment Seg may include four blocks.

<EX 1> shown in FIG. 4 represents an open section. The section SEC may correspond to a zone, and may include four segments Seg_1, Seg_2, Seg_3, and Seg_4.

The four blocks included in the first segment Seg_1 represent a state in which data is written in the memory 220. Thus, the four blocks included in the first segment Seg_1 may be valid blocks.

Three blocks of the four blocks included in the second segment Seg_2 represent the state in which data is written in the memory 220. The three blocks representing the state in which data is written in the memory 220 may be valid blocks. The remaining one block included in the second segment Seg_2 may be in a state in which data is not written in the memory 220. Thus, the remaining one block may be an invalid block.

The four blocks included in each of the third segment Seg_3 and the fourth segment Seg_4 may be in the state in which data is not written in the memory 220. Thus, the four blocks included in each of the third segment Seg_3 and the fourth segment Seg_4 may be invalid blocks. Since no data is stored for the third segment Seg_3 and the fourth segment Seg_4, the third segment Seg_3 and the fourth segment Seg_4 are empty and thus can be allocated for a write operation. As such, a segment Seg which can be allocated for a write operation may be referred to as a free segment. Therefore, the third segment Seg_3 and the fourth segment Seg_4 are free segments.

When a request for allocation of a segment Seg for a write operation is generated, the controller 110 may allocate a segment Seg including invalid blocks among segments Seg included in an open section. For example, the controller 110 may allocate the third segment Seg_3 included in the section SEC.

When the third segment Seg_3 is allocated for the write operation, corresponding data is written to a super block SB of the memory 220 that corresponds to the section SEC including the third segment Seg_3.

An operation of sequentially writing data corresponding to the remaining segments Seg of the open section, where data corresponding to some segments Seg has been written, may be performed. Since segments Seg including invalid blocks are sequentially allocated for the write operation, data may be written while maintaining the log structure file system of the storage device 200.

When such an open section including at least one free segment does not exist, a segment included in an empty section may be allocated for the write operation.

For example, referring to <EX2> shown in FIG. 4, an empty section SEC may include four segments Seg_1, Seg_2, Seg_3, and Seg_4 that include invalid blocks. All segments Seg included in the empty section may be free segments.

When a request for allocating a segment Seg for a write operation is generated, the controller 110 may allocate a segment Seg included in the empty section for the write operation.

The controller 110 may allocate a required number of segments Seg to write data during the write operation and sequentially allocate the segments Seg starting from the first segment Seg.

For example, when a request for allocating one segment Seg is generated, the controller 110 may allocate the first segment Seg_1. When a request for allocating two segments Seg is generated, the controller 110 may allocate the first segment Seg_1 and the second segment Seg_2 which is successive to the first segment Seg_1.

When the segments Seg included in the section SEC are allocated, data may be sequentially written to a super block SB of the memory 220 that corresponds to the section SEC.

When an open section or an empty section does not exist, the controller 110 may select a full section (or a full zone) where corresponding data is written, as a victim section, and may allocate a segment Seg using the victim section.

For example, referring to FIG. 5, <EX 3> and <EX 4> represent examples of victim sections.

Referring to <EX 3>, among segments Seg included in a section SEC, a first segment Seg_1, a third segment Seg_3, and a fourth segment Seg_4 may be valid segments Seg. Among the segments Seg included in the section SEC, a second segment Seg_2 may be an invalid segment Seg.

As the case may be, the controller 110 may allocate the second segment Seg_2 included in the section SEC, for a write operation. However, in order to store and manage data according to the log structure file system, in the case of <EX 3>, a segment Seg for a write operation cannot be allocated since the first segment Seg_1 is a valid segment. Therefore, the section SEC of <EX 3> may be regarded as a victim section in which segment allocation is not possible, so that data cannot be written.

On the other hand, referring to <EX 4>, among segments Seg included in a section SEC, a second segment Seg_2, a third segment Seg_3, and a fourth segment Seg_4 may be valid segments Seg. However, among the segments Seg included in the section SEC, a first segment Seg_1 may be an invalid segment Seg.

That is, the first segment Seg_1 that is included in the section SEC and is an invalid segment Seg is a free segment. In addition, when the second segment Seg_2 successive to the first segment Seg_1 is invalid, the second segment Seg_2 may be a free segment. That is, a first segment Seg that is included in a victim section and is invalid and at least one segment Seg that is successive to the first segment Seg and is invalid could be free segments.

Therefore, the controller 110 may allocate the first segment Seg_1 included in the section SEC for a write operation. That is, when the first segment Seg_1 in the victim section SEC is invalid, the controller 110 may allocate the first segment Seg_1 for the write operation.

When at least one segment Seg successive to the first segment Seg_1 is invalid, the controller 110 may allocate the first segment Seg_1 and the at least one segment Seg successive to the first segment Seg_1 for the write operation.

A storage area for a write operation may be allocated in units of segments. Since it is possible to allocate a segment Seg included in a victim section, the efficiency of allocating a segment Seg for a write operation may be improved. In addition, since it is possible to overwrite a victim section under a predetermined condition, data corresponding to an allocated segment Seg may be written to the memory 220 while maintaining the log structure file system of the storage device 200.

Figure 6:
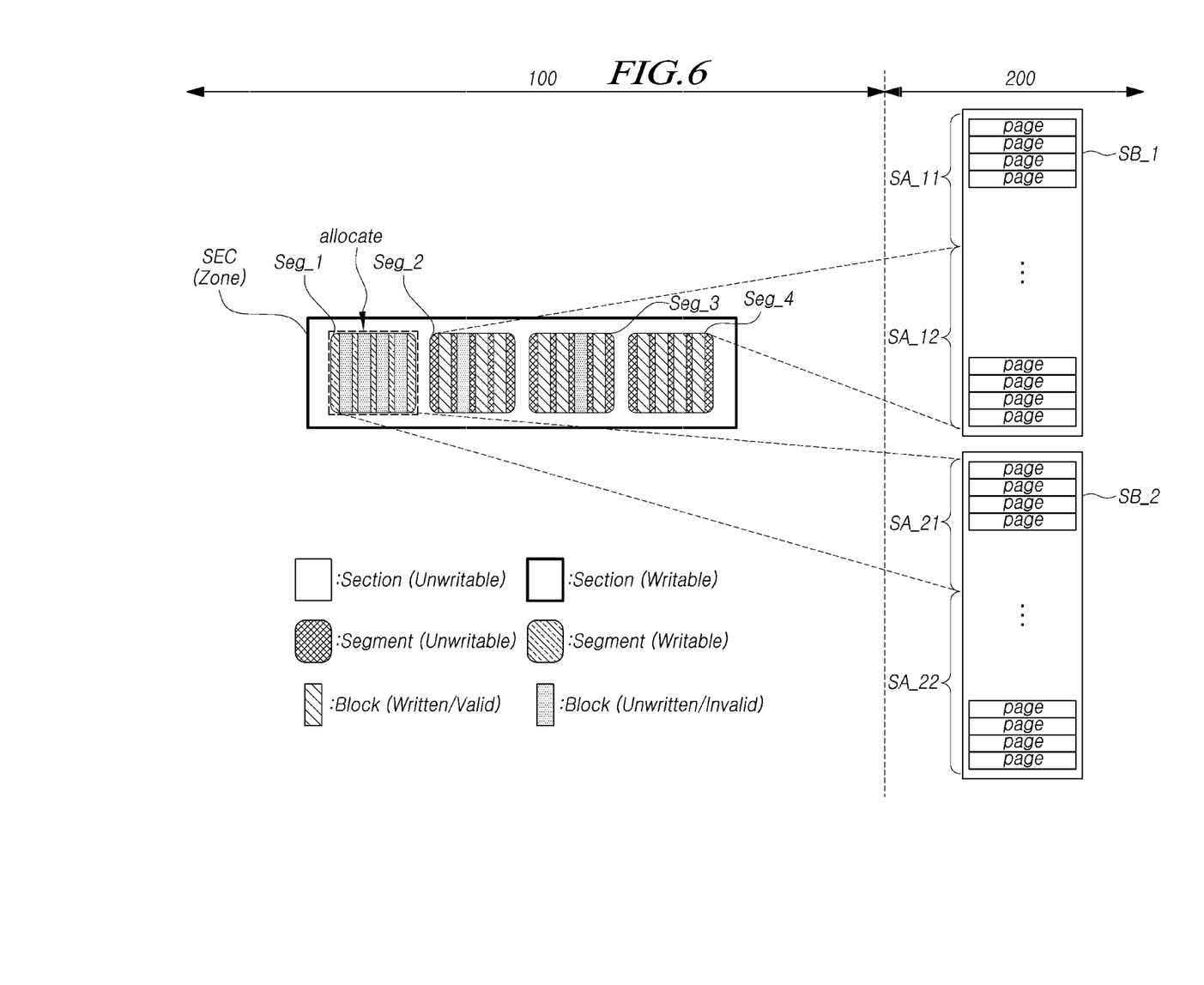
FIG. 6 illustrates a scheme in which a controller allocates a segment for a write operation and a scheme in which data is written to a storage device, according to an embodiment of the disclosed technology.

FIG. 6 illustrates a scheme in which the controller 110 allocates a segment Seg for a write operation and a scheme in which data is written to the storage device 200, according to an embodiment of the disclosed technology.

Referring to FIG. 6, a section SEC may include a first segment Seg_1, a second segment Seg_2, a third segment Seg_3, and a fourth segment Seg_4. The first segment Seg_1 may be an invalid segment Seg including invalid blocks. The second segment Seg_2, the third segment Seg_3, and the fourth segment Seg_4 may be valid segments Seg including valid blocks.

The section SEC may correspond to a first super block SB_1 included in the memory 220. The first super block SB1 may include a first storage area SA_11 and a second storage area SA_12.

Data corresponding to the second segment Seg_2 to the fourth segment Seg_4 included in the section SEC may be stored in the second storage area SA_12 of the first super block SB_1.

When allocation of a segment Seg for a new write operation is requested, the controller 110 may allocate the first segment Seg_1 included in the section SEC since the first segment Seg_1 is an invalid segment Seg. The new write operation may be performed based on the allocated first segment Seg_1.

The allocated first segment Seg_1 may correspond to a second super block SB_2 that is included in the memory 220. The second super block SB_2 may include a first storage area SA_21 and a second storage area SA_22. According to the new write operation based on the allocated first segment Seg_1, data may be written to the first storage area SA_21 of the second super block SB_2.

Since the first segment Seg_1 including invalid blocks in the section SEC in which blocks included in the second segment Seg_2 to the fourth segment Seg_4 are valid may be allocated for a write operation, overwrite for a victim section or a full section may be allowed.

Since, according to the new write operation based on the allocated first segment Seg_1, data is written to the first storage area SA_21 of the second super block SB_2 that is mapped to the section SEC, data resulting from the overwrite of the section SEC may be written to the memory 220 while maintaining the characteristics of the log structure file system.

When data of the second segment Seg_2 to the fourth segment Seg_4 included in the section SEC are moved or deleted, data stored in the first super block SB_1 may be entirely erased. After that, new data corresponding to the second segment Seg_2 to the fourth segment Seg_4 in the section SEC may be written to the second storage area SA_22 of the second super block SB_2 included in the memory 220.

Accordingly, the controller 110 that manages data based on a section SEC corresponding to a super block SB can maintain the log structure file system. As a result, it is easier to allocate a segment Seg included in a section SEC and the efficiency of a write operation can be improved.

When a segment Seg in a victim section is valid, the controller 110 may perform garbage collection, and then, allocate the segment Seg on which the garbage collection has been performed for a write operation.

Figure 7:
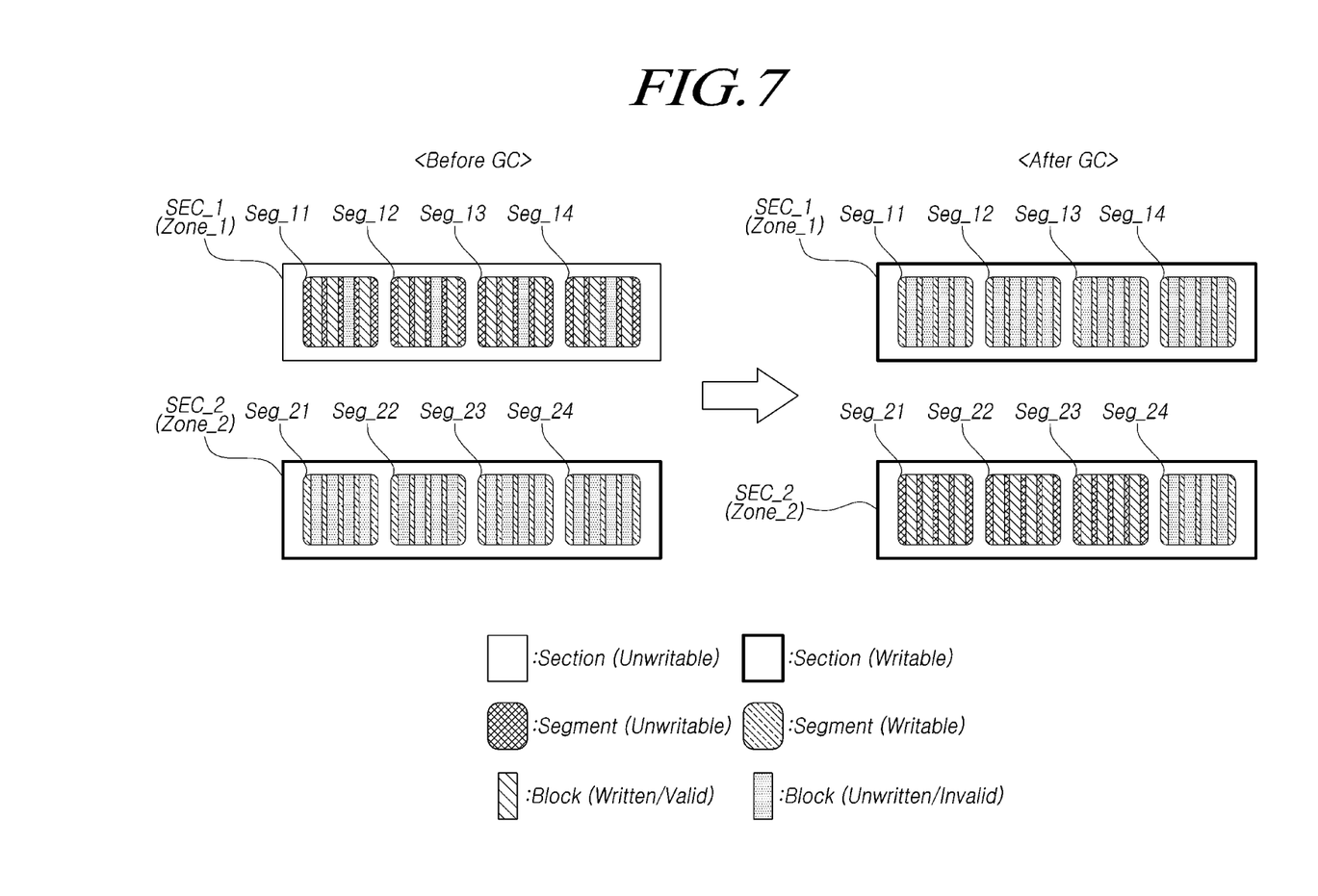
FIGS. 7 and 8 illustrate a scheme in which a controller performs a write operation after performing garbage collection according to an embodiment of the disclosed technology.
Figure 8:
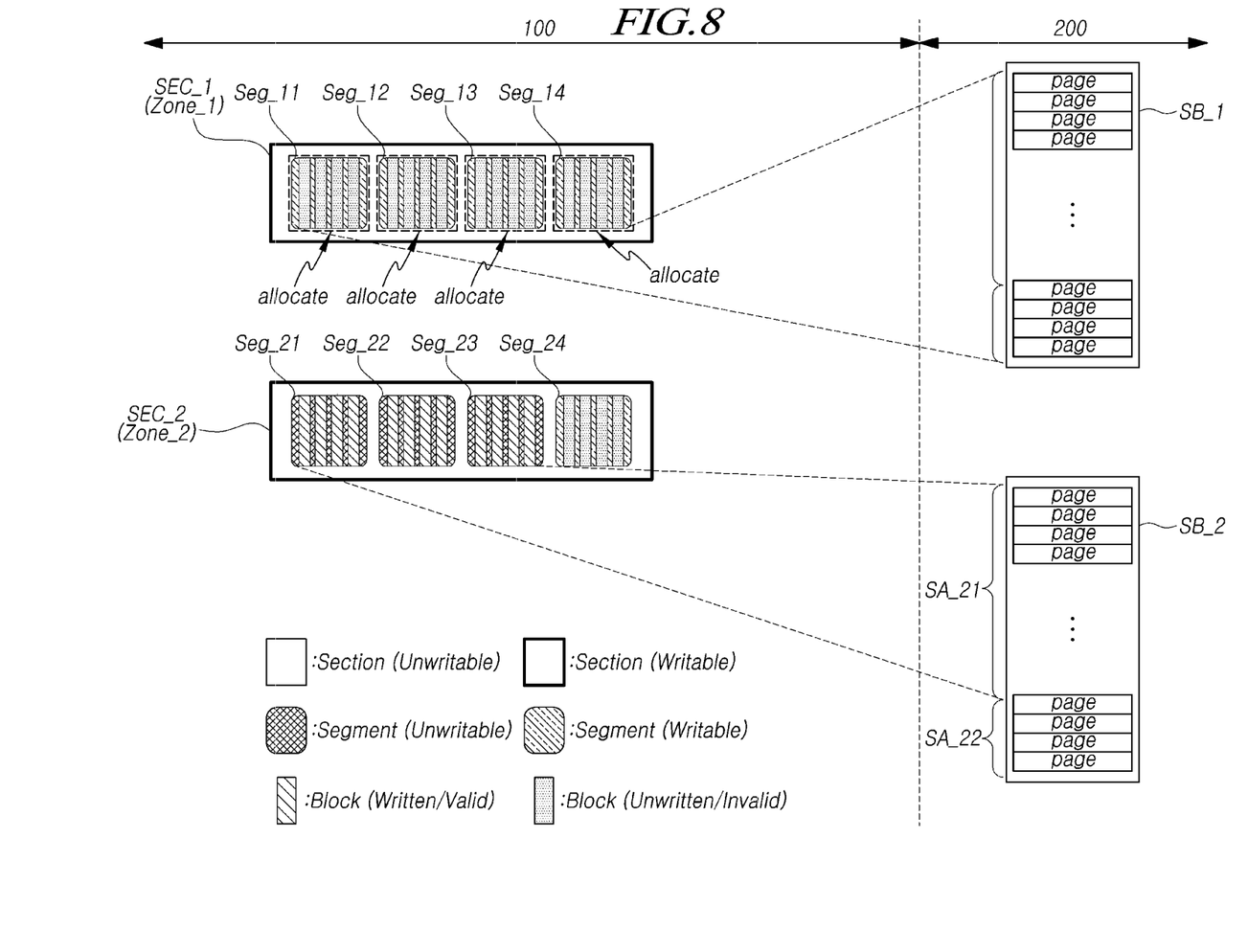

FIGS. 7 and 8 illustrate a scheme in which the controller 110 performs a write operation after performing garbage collection according to an embodiment of the disclosed technology.

FIG. 7 shows a first section SEC_1 and a second section SEC_2 included in the controller 110 as an example.

The first section SEC_1 may be a section SEC which is used to write data. A first segment Seg_11 to a fourth segment Seg_14 included in the first section SEC_1 may include valid blocks.

The second section SEC_2 may be a section SEC which is used for garbage collection. Although it is shown as an example that all segments Seg in the second section SEC_2 include invalid blocks, some of the segments Seg in the second section SEC_2 may include valid blocks.

When allocation of a segment Seg for a write operation is requested, the controller 110 may search for an open section or an empty section. When an open section or an empty section does not exist, the controller 110 may search for a victim section. For example, the controller 110 may search for a victim section in which a first segment Seg includes invalid blocks. The controller 110 may allocate, for a write operation, the first segment Seg that includes invalid blocks in the victim section.

If the first segment Seg in the victim section includes valid blocks, the controller 110 may perform garbage collection. For example, the controller 110 may move information written to at least one segment Seg in the first section SEC_1 to a segment Seg included in the second section SEC_2.

The controller 110 may move information written to valid blocks in the first segment Seg_11 of the first section SEC_1 to a segment Seg in the second section SEC_2. After that, the controller 110 may change a state of the first segment Seg_11 of the first section SEC_1 to be invalid.

The controller 110 may move information written to valid blocks in the second segment Seg_12 of the first section SEC_1 to a segment Seg in the second section SEC_2. After that, the controller 110 may change a state of the second segment Seg_12 of the first section SEC_1 to be invalid.

As the case may be, the controller 110 may move information written to valid blocks in the third segment Seg_13 and the fourth segment Seg_14 of the first section SEC_1 to segments Seg in the second section SEC_2. After that, the controller 110 may change states of the third segment Seg_13 and the fourth segment Seg_14 of the first section SEC_1 to be invalid.

The controller 110 may perform the garbage collection on the first segment Seg_11 in the first section SEC_1 and a segment Seg successive to the first segment Seg_11. For example, the controller 110 may sequentially perform the garbage collection on segments Seg in the first section SEC_1 until the required number of segments Seg for a write operation is secured.

For example, the controller 110 may perform the garbage collection on the first segment Seg_11 in the first section SEC_1. Alternatively, the controller 110 may perform the garbage collection on the first segment Seg_11 and the second segment Seg_12 successive to the first segment Seg_11 in the first section SEC_1.

Alternatively, as shown in FIG. 7, the controller 110 may perform the garbage collection on all the segments Seg in the first section SEC_1. The controller 110 may perform the garbage collection according to a request for allocation of segments Seg required for a write operation.

According to the garbage collection performed by the controller 110, information written to the segments Seg in the first section SEC_1 may be moved to segments Seg in the second section SEC_2. For example, the information written to the segments Seg in the first section SEC_1 may be moved to a first segment Seg_21, a second segment Seg_22, and a third segment Seg_23 in the second section SEC_2 as shown in FIG. 7.

After the garbage collection for the segments Seg in the first section SEC_1 is completed, the segments Seg in the first section SEC_1 may be allocated for a write operation.

For example, all the segments Seg in the first section SEC_1 may be allocated for the write operation. According to the allocation of the segments Seg, an operation of writing data to a super block SB included in the memory 220 may be performed.

For example, referring to FIG. 8, the first section SEC_1 may correspond to a first super block SB_1 included in the memory 220. The second section SEC_2 may correspond to a second super block SB_2 included in the memory 220.

As the garbage collection is performed, information written to the segments Seg included in the first section SEC_1 may be moved to at least one segment Seg included in the second section SEC_2.

The information written to the segments Seg included in the first section SEC_1 may be moved to the first segment Seg_21, the second segment Seg_22, and the third segment Seg_23 of the second section SEC_2. Data corresponding to the information moved to the second section SEC_2 may be written to the second super block SB_2 corresponding to the second section SEC_2. The second super block SB_2 may include a first storage area SA_21 and a second storage area SA_22. Therefore, the data may be written to the first storage area SA_21 included in the second super block SB_2. Thereafter, when a fourth segment Seg_24 included in the second section SEC_2 is allocated according to allocation of a new segment Seg or garbage collection, data corresponding to the fourth segment Seg_24 may be written to the second storage area SA_22 of the second super block SB_2.

Through the above garbage collection, all of the segments Seg included in the first section SEC_1 may be invalidated. Therefore, the controller 110 may allocate the segments Seg included in the first section SEC_1 for a write operation.

Since the data corresponding to all the segments Seg included in the first section SEC_1 have been moved to the second super block SB_2, the data stored in the first super block SB_1 corresponding to the first section SEC_1 may be erased. After that, as the segments Seg included in the first section SEC_1 are allocated for a new write operation, data corresponding to the newly allocated segments Se may be written to the first super block SB_1.

Since the garbage collection is performed by the controller 110, data may be written while a relationship between a section SEC managed by the controller 110 and a corresponding super block SB included in the memory 220 is maintained. Since the garbage collection is not performed by the storage device 200, the load of the storage device 200 may be reduced.

The garbage collection may be performed on a part of segments Seg included in a victim section. In this case, data may be written to the memory 220 according to overwrite of the victim section.

Figure 9:
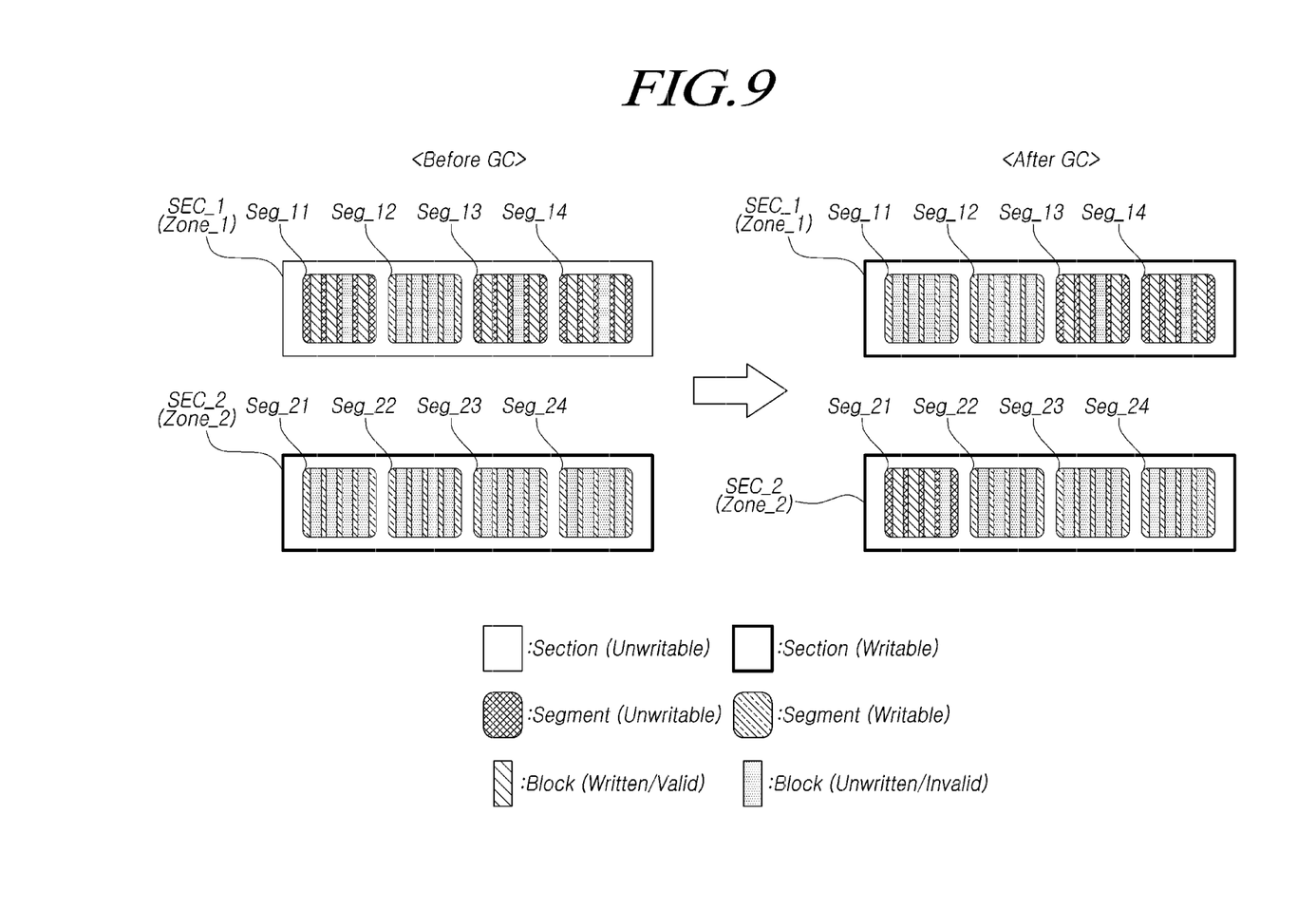
FIGS. 9 and 10 illustrate a scheme in which a controller performs a write operation after performing garbage collection according to another embodiment of the disclosed technology.
Figure 10:
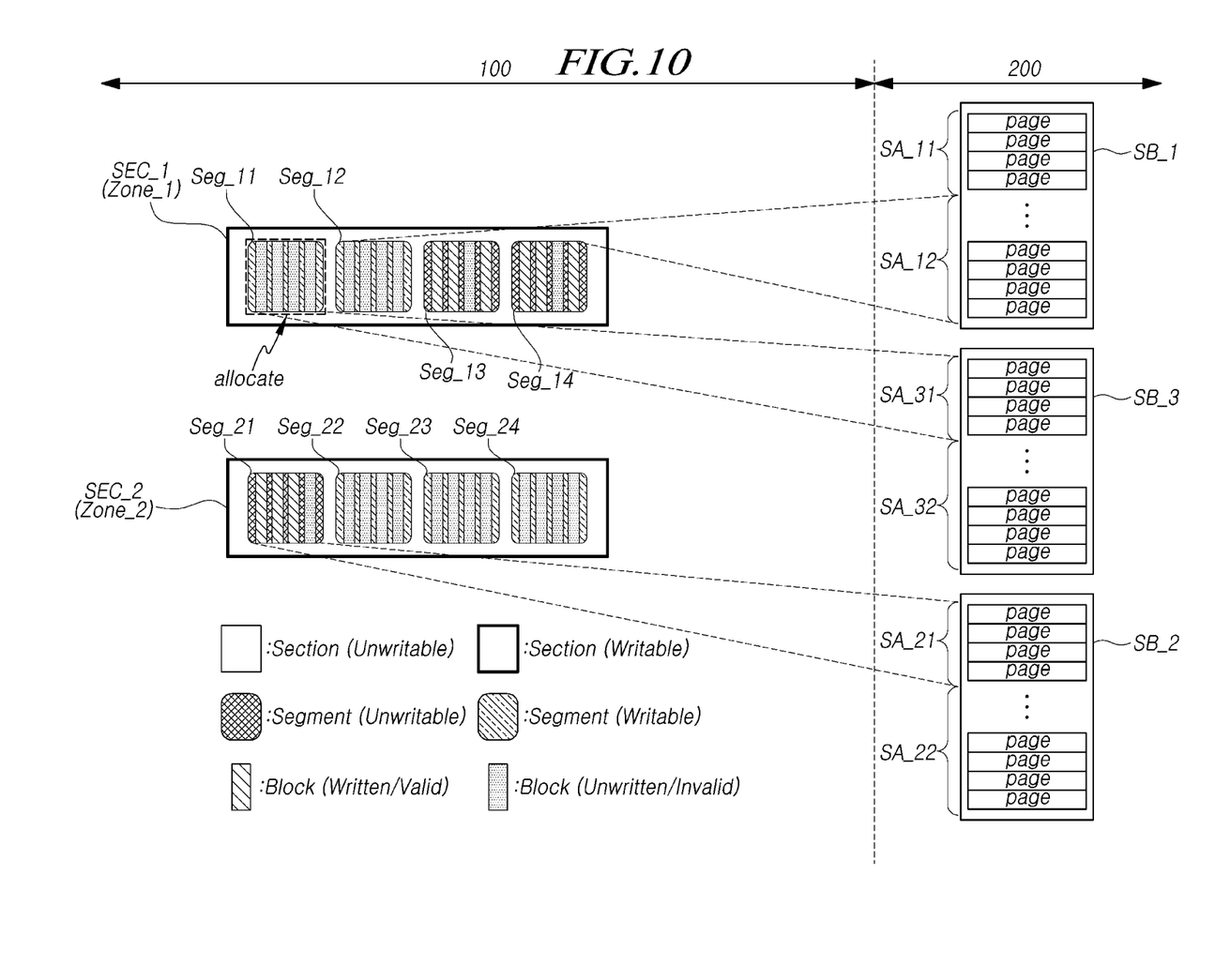

FIGS. 9 and 10 illustrates a scheme in which the controller 110 performs a write operation after performing garbage collection according to another embodiment of the disclosed technology.

Referring to FIG. 9, a first segment Seg_11, a third segment Seg_13, and a fourth segment Seg_14 included in a first section SEC_1 may be valid segments Seg including blocks to which data is written. A second segment Seg_12 included in the first section SEC_1 may be an invalid segment Seg including blocks to which data is not written.

Since data should be written according to the log structure file system, the second segment Seg_12 included in the first section SEC_1 may not be allocated for a write operation.

The controller 110 may secure a free segment in the first section SEC_1 by performing garbage collection on the first section SEC_1.

For example, the controller 110 may move information written to the first segment Seg_11 included in the first section SEC_1 to a segment Seg included in a second section SEC_2.

The second section SEC_2 may be a section SEC for garbage collection. According to garbage collection, the information written to the first segment Seg_11 may be moved to a first segment Seg_21 included in the second section SEC_2.

The controller 110 may perform garbage collection until a required number of segments Seg for a write operation are secured. FIG. 9 shows a case where the controller 110 performs garbage collection only on the first segment Seg_11 among valid segments Seg in the first section SEC_1.

The first segment Seg_11 included in the first section SEC_1 may be changed to be invalid according to garbage collection. Accordingly, the first segment Seg_11 included in the first section SEC_1 becomes a free segment. In addition, the second segment Seg_12 that is successive to the first segment Seg_11 and is invalid may also be a free segment.

After that, the controller 110 may allocate the first segment Seg_11 that is a free segment or allocate the first segment Seg_11 and the second segment Seg_12 that are free segments, according to an allocation-requested write operation.

Since garbage collection is not performed on segments other than the free segments included in the first section SEC_1, overwrite of the first section SEC_1 may be performed according to allocation of segments Seg for a write operation.

In addition, since garbage collection is not performed on some segments Seg included in the first section SEC_1, data may be still stored in a super block SB of the memory 220 that corresponds to the first section SEC_1. Therefore, in order to perform a write operation based on a newly allocated free segment, allocation of a new super block SB may be requested.

For example, referring to FIG. 10, garbage collection may be performed on a first segment Seg_11 included in a first section SEC_1. Therefore information written to the first segment Seg_11 included in the first section SEC_1 may be moved to a first segment Seg_21 included in a second section SEC_2.

As the information written to the first segment Seg_11 is moved to the first segment Seg_21, data may be written to an area of the memory 220 that corresponds to the first segment Seg_21 included in the second section SEC_2.

For example, the second section SEC_2 may correspond to a second super block SB_2.

The second super block SB_2 may include a first storage area SA_21 and a second storage area SA_22. As garbage collection is performed so that the information written to the first segment Seg_11 is moved to the first segment Seg_21 included in the second section SEC_2, data corresponding to the information moved to the first segment Seg_21 may be written to the first storage area SA_21 included in the second super block SB_2.

As described above, the garbage collection is performed between the first section SEC_1 and the second section SEC_2 by the controller 110, garbage collection by the storage device 200 may not be performed. Therefore, the storage device 200 may perform only a write operation according to a write command input from the host device 100.

By performing the garbage collection, the first segment Seg_11 included in the first section SEC_1 may be changed to be invalid. After that, the controller 110 may allocate the invalid first segment Seg_11 in response to a request for allocation of a segment Seg for a new write operation.

After the first segment Seg_11 is allocated for the new write operation, the new write operation may be performed based on the first segment Seg_11. However, since garbage collection has not been performed on a third segment Seg_13 and a fourth segment Seg_14 included in the first section SEC_1, it may be regarded that overwrite for a victim section or a full section is performed.

As the new write operation is performed based on the first segment Seg_11 included in the first section SEC_1, data may be written to a super block SB of the memory 220 that corresponds to the first section SEC_1.

For example, the first section SEC_1 may correspond to a first super block SB_1 included in the memory 220. The first super block SB_1 may include a first storage area SA_11 and a second storage area SA_12. The first storage area SA_11 may correspond to the first segment Seg_11 included in the first section SEC_1. The second storage area SA_12 may correspond to a second segment Seg_12 to the fourth segment Seg_14 included in the first section SEC_1.

However, since garbage collection is not performed on the second segment Seg_12 to the fourth segment Seg_14 included in the first section SEC_1, data of the second storage area SA_12 included in the first super block SB_1 may be maintained. Since data of the second storage area SA_12 included in the first super block SB_1 is maintained, data of the first storage area SA_11 included in the first super block SB_1 cannot be erased.

Accordingly, a third super block SB_3 may be provided for the first segment Seg_11 that is allocated for the new write operation. After the garbage collection is performed, a reset operation on the first section SEC_1 is not performed, and thus the new write operation based on the first segment Seg_11 may be performed on the third super block SB_3.

The third super block SB_3 may include a first storage area SA_31 and a second storage area SA_32. For example, the first storage area SA_31 and the second storage area SA_32 of the third super block SB_3 may correspond to the first storage area SA_11 and the second storage area SA_12 of the first super block SB_1, respectively.

According to the new write operation based on the first segment Seg_11 included in the first section SEC_1, data may be written to the first storage area SA_31 included in the third super block SB_3.

The first section SEC_1 may be mapped to the third super block SB_3 while maintaining a state in which the first section SEC_1 is mapped to the first super block SB_1. Mapping information that the first section SEC_1 is mapped to the first super block SB_1 and the third super block SB_3 may be stored, for example, in a designated area of the memory 220 of the storage device 200.

After that, data written to the first super block SB_1 may be entirely deleted when the third segment Seg_13 and the fourth segment Seg_14 included in the first section SEC_1 are emptied when garbage collection is performed on the third segment Seg_13 and the fourth segment Seg_14 or when an erase command is generated.

When the third segment Seg_13 and the fourth segment Seg_14 are emptied by the garbage collection, the third segment Seg_13 and the fourth segment Seg_14 may be allocated for a new write operation. Thus, data corresponding to the third segment Seg_13 and the fourth segment Seg_14 may be written to the second storage area SA_32 of the third super block SB_3.

As described above, allocation of a segment Seg for a write operation may be efficiently performed while maintaining the log structure file system.

As is apparent from the above description, according to the embodiment of the disclosed technology, since allocation for a write operation is performed in units of segments, allocation of a segment Seg for a write operation may be performed without performing garbage collection on an entire victim section. That is, a partial overwrite of the victim section may be allowed.

Since writing of data is performed by allocating a new super block SB while maintaining an existing super block SB that is included in the memory 220 and corresponds to the victim section, the data may be written to the memory 220 while maintaining the log structure file system.

Since garbage collection is not performed by the storage device 200, the load of the storage device 200 may be reduced. Since garbage collection is performed in units of segments rather than units of sections, a marginal space required for garbage collection may be reduced, and thus, a storage space may be efficiently used.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the disclosed technology as defined in the following claims.

What is claimed is:

1. A computing system comprising:
 a storage device configured to store data and including a plurality of super blocks; and
 a host device configured to manage the data stored in the storage device based on a plurality of sections each including at least two segments, and when it is determined that an empty section is absent among the plurality of sections upon a segment allocation request for a write operation, allocate at least one free segment including a first segment included in a victim section among the plurality of sections,
 wherein, when the first segment in the victim section is a valid segment to which data is written, the host device moves information written to the first segment to a segment included in a temporary section and changes the first segment to be invalid.

2. The computing system according to claim 1, wherein, until a number of free segments according to the segment allocation request are secured, the host device moves information written to a valid segment that is included in the victim section and successive to the first segment, to a segment included in the temporary section.

3. The computing system according to claim 1, wherein the victim section corresponds to a first super block among the plurality of super blocks in the storage device, and the temporary section corresponds to a second super block among the plurality of super blocks, and
 data corresponding to the information written to the first segment included in the victim section is written to the second super block.

4. The computing system according to claim 3, wherein data corresponding to information written to at least one segment other than the first segment included in the victim section is maintained in the first super block.

5. The computing system according to claim 3, wherein according to the write operation, data corresponding to information written to the at least one free segment included in the victim section is written to a third super block among the plurality of super blocks.

6. The computing system according to claim 5, wherein, when new information is written to a segment other than the at least one free segment among segments included in the victim section, data corresponding to the new information is written to the third super block.

7. The computing system according to claim 1, wherein the host device writes information according to the write operation to the at least one free segment including the first segment included in the victim section.

8. The computing system according to claim 7, wherein, before the information according to the write operation is written to the at least one free segment including the first segment included in the victim section, a reset operation is not performed on the victim section.

9. The computing system according to claim 1, wherein the at least one free segment includes the first segment and at least one segment that is successive to the first segment and invalid.

10. The computing system according to claim 1, wherein the victim section includes at least one segment that is successive to the first segment and valid.

11. The computing system according to claim 1, wherein each of the plurality of sections corresponds to a corresponding one of the plurality of super blocks where corresponding data is stored.

12. A host device comprising:
a host memory; and
a controller configured to manage data stored in a storage device based on a plurality of sections each including at least two segments, and when it is determined that an empty section is absent among the plurality of sections upon a segment allocation request for a write operation, move information written to a first segment in a victim section among the plurality of sections to a segment in a temporary section to change the first segment to be invalid, and then allocate the first segment for the write operation.

13. The host device according to claim 12, wherein the controller moves information written to a second segment in the victim section to a segment in the temporary section, the second segment being successive the first segment and valid.

14. The host device according to claim 12, wherein a second segment successive to the first segment in the victim section is valid, and information according to the write operation is written to the first segment in the victim section.

15. The host device according to claim 12, wherein each of the plurality of sections corresponds to a corresponding one of a plurality of super blocks in the storage device.

16. The host device according to claim 15, wherein, before the first segment in the victim section is allocated, the victim section is mapped to one super block in the storage device, and after the first segment in the victim section is allocated, the victim section is mapped to at least two super blocks in the storage device.

17. The host device according to claim 15, wherein the temporary section is mapped to a super block other than a super block mapped to the victim section.

* * * * *